(No Model.)

A. I. LOOP.
STEAM ENGINE GOVERNOR.

No. 330,411. Patented Nov. 17, 1885.

Witnesses:

Inventor:

UNITED STATES PATENT OFFICE.

A. IRWIN LOOP, OF NORTH EAST, PENNSYLVANIA, ASSIGNOR OF ONE-HALF TO WILLIAM H. STETSON AND CHARLES LOOP, BOTH OF SAME PLACE.

STEAM-ENGINE GOVERNOR.

SPECIFICATION forming part of Letters Patent No. 330,411, dated November 17, 1885.

Application filed August 13, 1885. Serial No. 174,240. (No model.)

*To all whom it may concern:*

Be it known that I, A. IRWIN LOOP, a citizen of the United States, residing in North East, county of Erie, and State of Pennsylvania, have invented a new and useful Steam-Engine Governor, of which the following is a full, clear, and exact description.

My invention consists of a hollow shaft running in bearings on the engine-frame, similar to the main shaft of the engine and parallel to it. It is connected to the main shaft by a set of gearing which gives it a rotary motion equal to that of the engine-shaft. Through the center of the hollow shaft there passes another shaft, just loosely enough to permit a slight endwise movement. One end of this smaller shaft passes through the hollow shaft a short distance, and is provided on its sides with a series of ascending lugs, by which it is moved endwise by similar ascending grooves in the ends of arms of a set of balls or weights attached to the end of the hollow shaft. The other end of the inner shaft passes into a bell-shaped opening in the end of the hollow shaft, and is connected by a jointed arm to a block that works in a slide across the end of the hollow shaft. This block carries a pin, to which is attached the rod that moves the valves of the engine. The balls or weights on the end of the hollow shaft are held in by springs. When the engine is started, the springs hold the balls or weights down. This keeps the inner shaft in place, and, through the jointed arm, keeps the block out from the center of the slide and gives the valve-rod full play. As the speed increases the centrifugal force, the balls overcome the springs and move slightly outward. This, by means of the ascending grooves in the ball-arms, pulls the inner shaft a slight distance through the hollow shaft, which draws the block toward the center of the slide and lessens the stroke of the valve-rod, thereby giving the engine less steam. When the speed is reached that is desired, the block is drawn near enough the center of the slide so that the valve opens the ports only enough to keep the engine at that speed. Should more work be put upon the engine, the springs draw in the balls and shove out (by means of the inner shaft) the block, giving the engine more steam, thereby allowing it to maintain exactly the same speed. I attain this object by the mechanism illustrated in the accompanying drawings, in which similar letters of reference indicate corresponding parts in all the figures.

Figure 4:
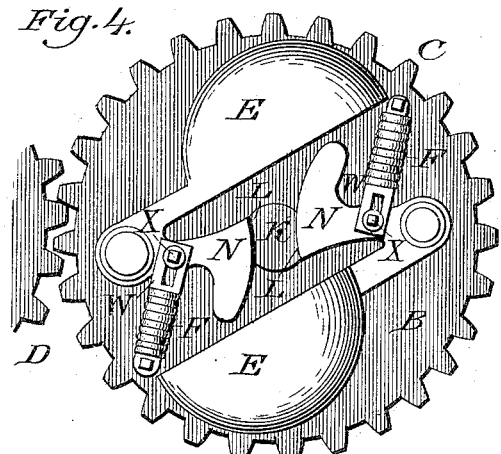
Figure 5:
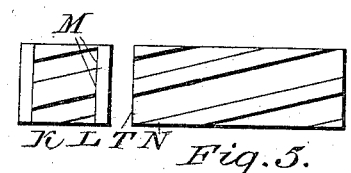
Figure 3:
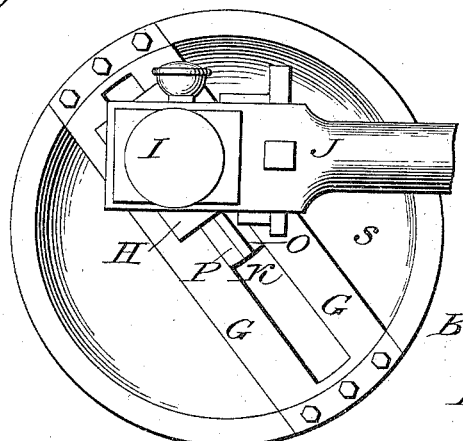
Figure 1:
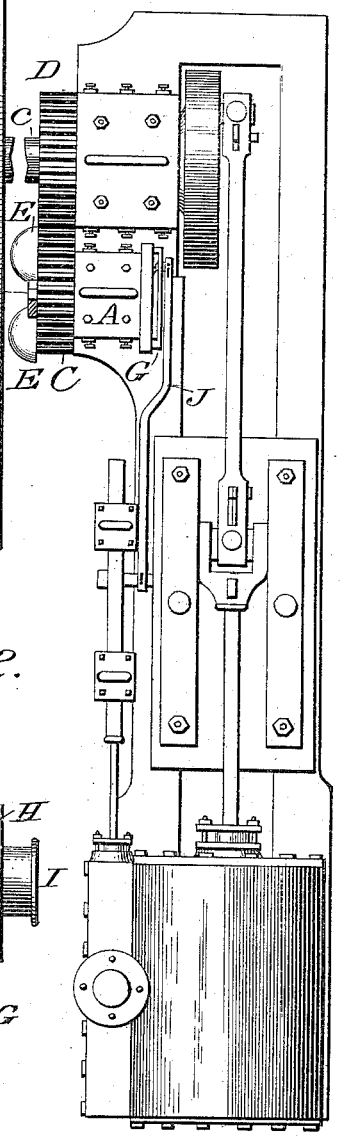
Figure 2:
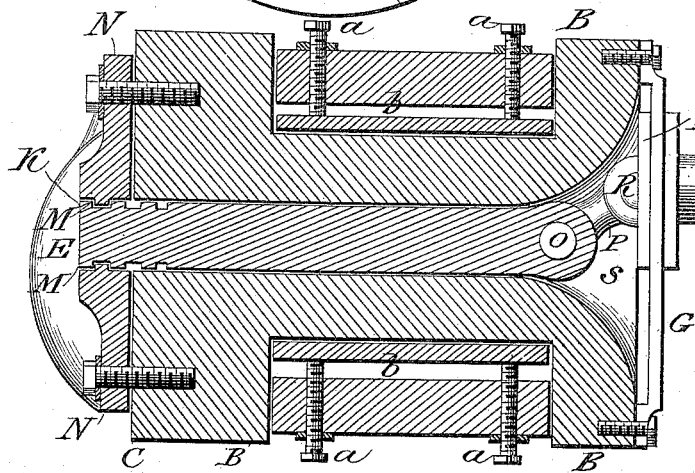

Figure 1 is a top view of a steam-engine, showing the manner in which my improved governor is attached. Fig. 2 is a horizontal section through my machine on the plane of the cheek-block studs, showing the position of the inner shaft, the valve-rod block, and the grooved-arm ends of the balls. Fig. 3 is an end view of the hollow shaft, showing the position of the valve-rod block and slides. Fig. 4 is an end view opposite from Fig. 3, and shows the position of the springs and balls. Fig. 5 is a detail of the ball-arm ends and end of inner shaft, showing the position of the grooves.

Upon the engine-frame I place a box-bearing, A, fitted with studs $a$ and cheek-blocks $b$. In this bearing I fit a short hollow shaft, B, of sufficient length and diameter to give it the requisite stiffness. On one end of this shaft I provide a gearing, $c$, which meshes with a similar gear, D, on the engine-shaft $c$. The gear C is of sufficient diameter to give room on its sides for a set of balls and springs, E F. Across the other end of the hollow shaft B, I place a slide, G, and into this slide I fit a block, H, having a pin, I, to which the valve-rod J is attached. Through the center of the hollow shaft B, I pass another shaft, K. This other shaft, which may be round, square, or other suitable form, has a slight endwise movement, (ordinarily about one-half of one inch,) but no circular movement within the hollow shaft B, and maintains the same relation to the shaft B at all times as do, also, the balls and springs E F and the slides G, whether said shaft is revolving or at rest. One end of shaft K is provided with two opposite concave surfaces, L, fitted with lugs M, set at an angle of about thirty degrees, working in similar grooves, T, on the end of the ball-arms N. The other end of the shaft K is fitted with a knuckle-joint, O, to a short arm, P, by which it is connected by a similar joint, R, to the block H. The shaft B has a bell-shaped opening, S, in the end, which allows the arm P to adjust itself to the position of the shaft K.

The practical operation of my governor is as follows: I adjust the springs F by means of the slotted bars W and studs X, to secure the right tension to balance the centrifugal force of the balls E at a given speed. I then admit steam into the steam-chest of the engine at full boiler-pressure. The turning of the engine-shaft causes the hollow shaft B to revolve. This motion gradually causes the balls E to stand out from the center. The grooves in the arms N, working against the lugs M on the shaft K, draw it endwise. This draws the block H toward the center of the slide G. This lessens the travel of the engine-valve by shortening the stroke of the valve-rod J, and consequently gives the engine less steam, until the amount of steam is just sufficient to keep the engine running at a given speed.

The superiority of this governor over others now in use is, first, it changes the stroke of the valve without changing the lead; second, it allows full boiler-pressure in the steam-chest, being the most economical way in which steam can be used; third, the sliding block, in combination with the shaft and balls, allows the valve to be adjusted to cut off at any distance that may be required when the engine is working under a load; fourth, it cannot run away, as, should any part break, the engine will necessarily stop; fifth, this device can be applied to any engine, and will work any kind of a valve.

Having thus described my invention, I claim as new and desire to secure by Letters Patent—

The combination of the hollow shaft B with the inner shaft, K, shaft B having on one end a gear meshing with a similar gear on the engine-shaft, also carrying on one end a set of balls and springs, on the other end a slide carrying a sliding block, to be connected by a pin to the valve-rod, shaft K passing through shaft B lengthwise and having one end fitted by lugs to grooves of ends of ball-arms, the other end being connected to the sliding block by means of the knuckle-joints and short arm, all substantially as set forth.

A. IRWIN LOOP.

Witnesses:
ALFRED SHORT,
E. W. MERRILL.